US012624162B2

(12) United States Patent
Son et al.

(10) Patent No.: US 12,624,162 B2
(45) Date of Patent: May 12, 2026

(54) POLYCARBONATE COPOLYMER

(71) Applicants: LG CHEM, LTD., Seoul (KR); YONSEI UNIVERSITY, UNIVERSITY—INDUSTRY FOUNDATION (UIF), Seoul (KR)

(72) Inventors: Youngwook Son, Daejeon (KR); Hyong Min Bahn, Daejeon (KR); Byeong-Su Kim, Kim (KR); Taehyung Kim, Seoul (KR); Yeji Yu, Jeollabuk-do (KR)

(73) Assignees: LM CHEM, LTD, Seoul (KR); YONSEI UNIVERSITY, UNIVERSITY-INDUSTRY FOUNDATION (UIF), Seoul (KR)

( * ) Notice: Subject to any disclaimer, the term of this patent is extended or adjusted under 35 U.S.C. 154(b) by 533 days.

(21) Appl. No.: 18/265,516

(22) PCT Filed: Aug. 8, 2022

(86) PCT No.: PCT/KR2022/011752
§ 371 (c)(1),
(2) Date: Jun. 6, 2023

(87) PCT Pub. No.: WO2023/018136
PCT Pub. Date: Feb. 16, 2023

(65) Prior Publication Data

US 2024/0002595 A1 Jan. 4, 2024

(30) Foreign Application Priority Data

Aug. 9, 2021 (KR) ........................ 10-2021-0104783

(51) Int. Cl.
*C08G 64/12* (2006.01)
*C08G 64/16* (2006.01)
(Continued)

(52) U.S. Cl.
CPC ............ *C08G 64/12* (2013.01); *C08G 64/16* (2013.01); *C08G 64/28* (2013.01); *C08G 64/307* (2013.01); *C08L 69/00* (2013.01)

(58) Field of Classification Search
CPC ................................ C08G 64/12; C08L 69/00
See application file for complete search history.

(56) References Cited

U.S. PATENT DOCUMENTS

| | | | | |
|---|---|---|---|---|
| 7,547,755 | B2 | 6/2009 | Heuer | |
| 10,604,623 | B2 * | 3/2020 | Morooka | G02B 1/041 |

(Continued)

FOREIGN PATENT DOCUMENTS

| | | | |
|---|---|---|---|
| CN | 101516967 | A | 8/2009 |
| CN | 107915737 | | 4/2018 |

(Continued)

*Primary Examiner* — John M Cooney
*Assistant Examiner* — Surbhi M Du
(74) *Attorney, Agent, or Firm* — Bryan Cave Leighton Paisner LLP

(57) ABSTRACT

Provided is a polycarbonate copolymer including a repeating unit of the following Chemical Formula 1, where the polycarbonate copolymer can have improved heat resistance:

[Chemical Formula 1]

(Continued)

wherein in Chemical Formula 1, $R_1$, $R_2$, n1 and n2 are as defined in the specification.

11 Claims, 3 Drawing Sheets

(51) Int. Cl.

| | |
|---|---|
| ***C08G 64/28*** | (2006.01) |
| ***C08G 64/30*** | (2006.01) |
| ***C08L 69/00*** | (2006.01) |

(56) References Cited

U.S. PATENT DOCUMENTS

| | | | |
|---|---|---|---|
| 2008/0081896 | A1 | 4/2008 | Heuer |
| 2008/0244838 | A1 | 10/2008 | Guerin et al. |
| 2018/0355106 | A1 | 12/2018 | Morooka et al. |
| 2019/0047954 | A1 | 2/2019 | Mizoguchi et al. |
| 2019/0135748 | A1 | 5/2019 | Swaminathan et al. |
| 2021/0054142 | A1 | 2/2021 | Ozaki et al. |

FOREIGN PATENT DOCUMENTS

| | | | |
|---|---|---|---|
| CN | 108430970 | A | 8/2018 |
| CN | 108884041 | A | 11/2018 |
| CN | 110662783 | A | 1/2020 |
| EP | 4335889 | A1 | 3/2024 |
| KR | 10-2015-0037712 | | 4/2015 |
| KR | 10-2018-0102562 | | 9/2018 |
| KR | 10-2019-0083236 | | 7/2019 |
| KR | 10-2020-0010230 | | 1/2020 |
| KR | 10-2021-0029027 | | 3/2021 |
| TW | 200835718 | A | 9/2008 |
| TW | 201736344 | A | 10/2017 |
| TW | 201900596 | A | 1/2019 |
| WO | 2017-182984 | | 10/2017 |

* cited by examiner

POLYCARBONATE COPOLYMER

CROSS-REFERENCE TO RELATED APPLICATION

This application is a National Stage Application of International Application No. PCT/KR2022/011752 filed on Aug. 8, 2022, which claims the benefit of Korean Patent Application No. 10-2021-0104783 filed on Aug. 9, 2021 with the Korean Intellectual Property Office, the entire contents of which are incorporated herein by reference.

TECHNICAL FIELD

The present disclosure relates to a polycarbonate copolymer and an article comprising same.

BACKGROUND

A polycarbonate resin is prepared by condensation-polymerization of an aromatic diol such as bisphenol A with a carbonate precursor such as a phosgene, and has excellent impact strength, dimensional stability, heat resistance, and transparency, etc. Thus, the polycarbonate resin has application in a wide range of uses, such as exterior materials of electrical and electronic products, automobile components, building materials, and optical components, etc.

In recent years, in order to apply such a polycarbonate resin to more diverse fields, many studies have been attempted to obtain desired physical properties by copolymerizing two or more types of aromatic diol compounds having different structures and introducing units having different structures into the main chain of polycarbonate.

Particularly, in recent years, as the application field of polycarbonate resin has expanded, it is necessary to improve the heat resistance while maintaining the intrinsic physical properties of the polycarbonate resin. Accordingly, attempts to introduce repeating units having various structures as repeating units of the polycarbonate resin are increasing.

Therefore, the present inventors have confirmed that the polycarbonate copolymer containing a repeating unit having a specific structure is particularly improved in heat resistance, as will be described later, and completed the present disclosure.

DETAILED DESCRIPTION

Technical Problem

It is an object of the present disclosure to provide a polycarbonate copolymer that contains a repeating unit having a specific structure and thus is particularly improved in heat resistance.

It is another object of the present disclosure to provide an article comprising the polycarbonate copolymer,

Technical Solution

In order to achieve the above object, according to the present disclosure, provided is a polycarbonate copolymer comprising a repeating unit of Chemical Formula 1:

[Chemical Formula 1]

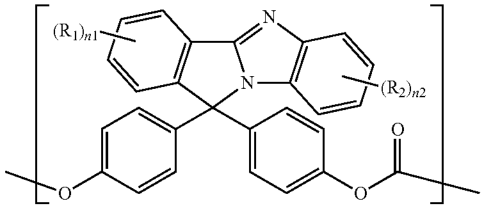

wherein in Chemical Formula 1:

$R_1$ and $R_2$ are each independently hydrogen, a $C_{1-10}$ alkyl, a $C_{1-10}$ alkoxy, or halogen; and n1 and n2 are each independently an integer of 0 to 4.

The polycarbonate copolymer according to the present disclosure includes the repeating unit of Chemical Formula 1, and particularly can provide a polycarbonate copolymer having remarkably increased heat resistance. The repeating unit of Chemical Formula 1 is similar to the structure of bisphenol A, which has been widely used in the past, but has a structure in which four rings are fused, and thus has a structure whose molecule is rigid as compared to bisphenol A, and also can include nitrogen in the molecule and thus can improve heat resistance through stabilization of the structure.

Below, the present disclosure will be described in more detail.

(Repeating Unit of Chemical Formula 1)

In Chemical Formula 1, preferably, $R_1$ is hydrogen.

Preferably, each $R_2$ is independently hydrogen, a $C_{1-4}$ alkyl, a $C_{1-4}$ alkoxy, or halogen. More preferably, each $R_2$ is independently hydrogen, methyl, or chloro.

Preferably, the repeating unit of Chemical Formula 1 is any one selected from the group consisting of:

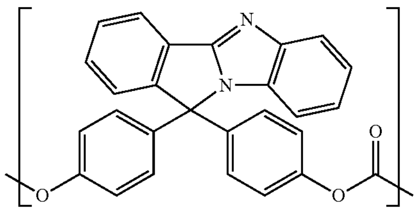

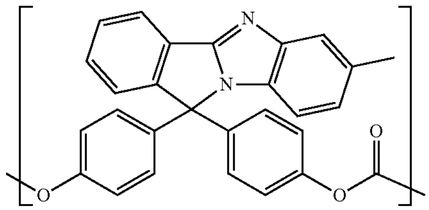

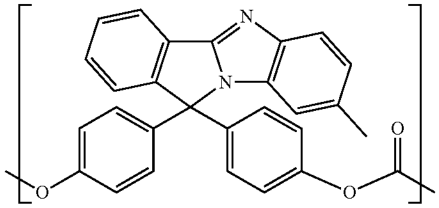

-continued

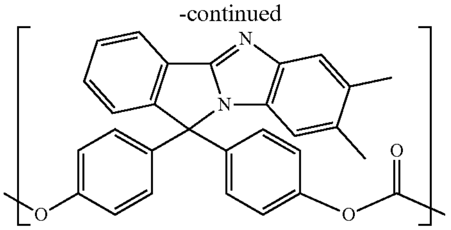

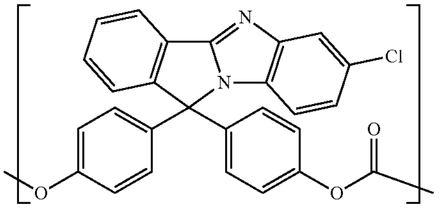

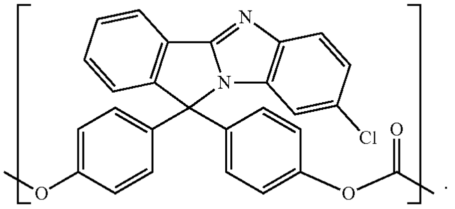

Meanwhile, the repeating unit of Chemical Formula 1 is derived from a monomer compound of the following Chemical Formula 1-1:

[Chemical Formula 1-1]

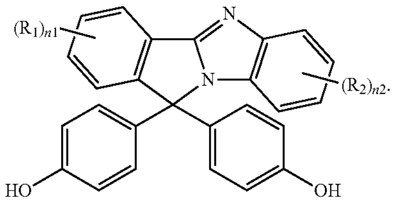

The "derived from the monomer compound" means that the hydroxy group of the compound of Chemical Formula 1-1 reacts with a carbonate precursor to form a repeating unit of Chemical Formula 1.

As the carbonate precursor, at least one selected from the group consisting of dimethyl carbonate, diethyl carbonate, dibutyl carbonate, dicyclohexyl carbonate, diphenyl carbonate, ditoryl carbonate, bis(chlorophenyl) carbonate, di-m-cresyl carbonate, dinaphthyl carbonate, bis(diphenyl) carbonate, phosgene, triphosgene, diphosgene, bromophosgene and bishaloformate can be used. Preferably, triphosgene or phosgene can be used.

In addition, the compound of Chemical Formula 1-1 can be prepared by the method of the following Reaction Scheme 1:

[Reaction Scheme 1]

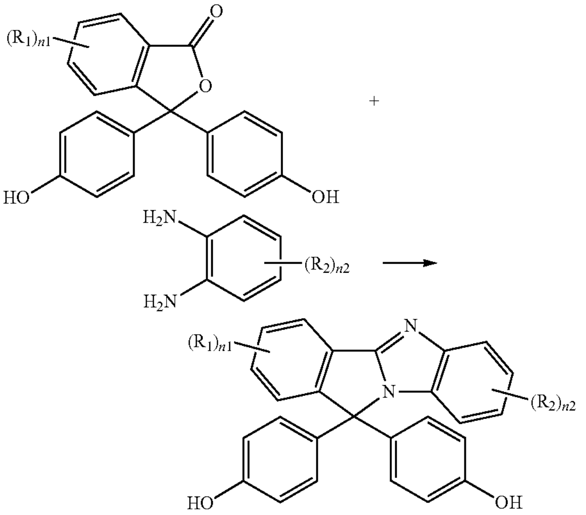

wherein in Reaction Scheme 1, $R_1$, $R_2$, n1 and n2 are as defined above. The reaction is preferably carried out under acidic conditions, and the preparation method can be embodied in Examples provided hereinafter.

(Repeating Unit of Chemical Formula 2)

In addition, the polycarbonate copolymer of the present disclosure can further include a repeating unit of the following Chemical Formula 2, if necessary:

[Chemical Formula 2]

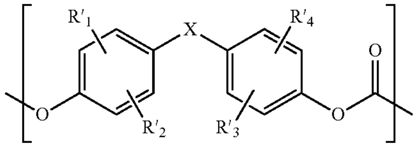

wherein in Chemical Formula 2:

X is a $C_{1-10}$ alkylene that is unsubstituted or substituted with phenyl, a $C_{3-15}$ cycloalkylene that is unsubstituted or substituted with a $C_{1-10}$ alkyl, O, S, SO, $SO_2$, or CO; and $R'_1$ to $R'_4$ are each independently hydrogen, a $C_{1-10}$ alkyl, a $C_{1-10}$ alkoxy, or halogen.

By further comprising the repeating unit of Chemical Formula 2, two types of repeating units are contained together, and with the repeating unit of Chemical Formula 1 and Chemical Formula 2, the physical properties of the polycarbonate copolymer can be adjusted. For example, since the repeating unit of Chemical Formula 1 can improve heat resistance as compared to the repeating unit of Chemical Formula 2, desired heat resistance properties can be achieved by adjusting the content of each repeating unit.

In Chemical Formula 2, preferably, X is a straight-chain or branched $C_{1-10}$ alkylene that is unsubstituted or substituted with phenyl, more preferably, methylene, ethane-1,1-diyl, propane-2,2-diyl, butane-2,2-diyl, 1-phenylethane-1,1-diyl, or diphenylmethylene. Further, preferably, X is cyclohexane-1,1-diyl, O, S, SO, $SO_2$, or CO.

Further, preferably, $R'_1$ to $R'_4$ are each independently hydrogen, methyl, chloro, or bromo.

Preferably, the repeating unit of Chemical Formula 2 can be derived from at least one monomer compound selected from the group consisting of bis(4-hydroxyphenyl)methane, bis(4-hydroxyphenyl) ether, bis(4-hydroxyphenyl)sulfone, bis(4-hydroxyphenyl)sulfoxide, bis(4-hydroxyphenyl)-sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)-cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)-propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)-diphenylmethane.

The "derived from the monomer compound" means that the hydroxy group of the monomer compound reacts with the carbonate precursor to form the repeating unit of Chemical Formula 2.

For example, when bisphenol A as a monomer compound and triphosgene as a carbonate precursor are polymerized, the repeating unit of Chemical Formula 2 has the following structure:

[Chemical Formula 2-1]

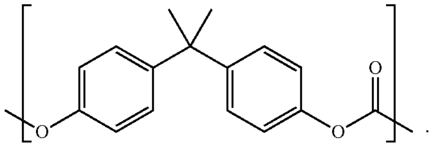

The carbonate precursor is the same as described in the carbonate precursor that can be used in the formation of the repeating unit of Chemical Formula 1 described above.

Polycarbonate Copolymer

As described above, the polycarbonate copolymer according to the present disclosure includes the repeating unit of Chemical Formula 1, and in this case, it becomes substantially a homopolymer.

Further, the polycarbonate copolymer according to the present disclosure includes the repeating unit of Chemical Formula 1 and the repeating unit of Chemical Formula 2, and in this case, it becomes a random copolymer. In this case, preferably, the weight ratio between the repeating unit of Chemical Formula 1 and the repeating unit of Chemical Formula 2 of the present disclosure is 10:90 to 90:10, more preferably 15:85 to 85:15, and most preferably 20:80 to 80:20.

Preferably, the polycarbonate copolymer according to the present disclosure has a weight average molecular weight (g/mol) of 10,000 to 100,000. More preferably, the polycarbonate copolymer according to the present disclosure has a weight average molecular weight (g/mol) of 15,000 or more, 20,000 or more, 25,000 or more, 30,000 or more, or 35,000 or more; and 90,000 or less, 85,000 or less, 80,000 or less, 75,000 or less, 70,000 or less, 65,000 or less, 60,000 or less, or 55,000 or less.

Preferably, the polycarbonate copolymer according to the present disclosure has a glass transition temperature of 150 to 220° C. More preferably, the glass transition temperature of the polycarbonate copolymer according to the present disclosure is 155° C. or more, or 160° C. or more; and 215° C. or less, or 210° C. or less.

Meanwhile, the polycarbonate copolymer according to the present disclosure can be prepared by a preparation method comprising the step of polymerizing a composition containing the monomer compound of Chemical Formula 1-1 and the carbonate precursor described above. In the case of including the repeating unit of Chemical Formula 2, it can be prepared by including the repeating unit-related monomer compound of Chemical Formula 2 in the composition.

As the polymerization method, an interfacial polymerization method can be used as an example, and in this case, the polymerization reaction can be performed under normal pressure and low temperature, and the molecular weight can be easily adjusted. The interfacial polymerization is preferably carried out in the presence of an acid binder and an organic solvent. In addition, the interfacial polymerization can include, for example, a step of adding a coupling agent after pre-polymerization and then performing polymerization again.

The materials used for the interfacial polymerization are not particularly limited as long as they are materials that can be used for polymerization of the polycarbonate copolymer, and its use amount can also be adjusted as needed.

As the acid binder, for example, an alkali metal hydroxide such as sodium hydroxide or potassium hydroxide, or an amine compound such as pyridine can be used.

The organic solvent is not particularly limited as long as it is a solvent usually used for polymerization of polycarbonate, and as an example, halogenated hydrocarbons such as methylene chloride and chlorobenzene can be used.

In addition, the interfacial polymerization can further use a reaction accelerator such as a tertiary amine compound, a quaternary ammonium compound, or a quaternary phosphonium compound, including triethylamine, tetra-n-butylammonium bromide, or tetra-n-butylphosphonium bromide in order to promote the reaction.

The reaction temperature of the interfacial polymerization is preferably 0 to 40° C., and the reaction time is preferably 10 minutes to 5 hours. In addition, during the interfacial polymerization reaction, the pH is preferably maintained at 9 or more or 11 or more.

Moreover, the interfacial polymerization can be performed by further including a molecular weight modifier. The molecular weight modifier can be added before, during or after the initiation of polymerization.

A monoalkylphenol can be used as the molecular weight modifier, and an example of the monoalkylphenol is at least one selected from the group consisting of p-tert-butylphenol, p-cumylphenol, decylphenol, dodecylphenol, tetradecylphenol, hexadecylphenol, octadecylphenol, eicosylphenol, docosylphenol and triacontylphenol, preferably, it is p-tert-butylphenol, and in this case, the effect of adjusting the molecular weight is large.

In addition, the present disclosure provides an article comprising the above-mentioned polycarbonate copolymer.

Preferably, the article is an injection molded article. Also, the article can further include, for example, at least one selected from the group consisting of an antioxidant, a heat stabilizer, a light stabilizer, a plasticizer, an antistatic agent, a nucleating agent, a flame retardant, a lubricant, an impact-reinforcing material, an optical brightener, an UV absorber, a pigment and a dye.

The method for preparing the article can comprise the steps of mixing the polycarbonate copolymer according to the present disclosure and additives such as antioxidants using a mixer, then extrusion-molding the mixture with an extruder to produce pellets, drying the pellets and then injecting them with an injection molding machine.

Advantageous Effects

As described above, the present disclosure can provide a polycarbonate copolymer having improved heat resistance by including a repeating unit having a specific structure.

EXAMPLES

Hereinafter, embodiments of the present disclosure will be described in more detail with reference to examples. However, the following examples are merely illustrative of embodiments of the present invention, and the scope of the present disclosure is not limited thereby.

The following physical properties were measured in the Examples and Experimental Examples below.

1) Weight average molecular weight (g/mol): It was calibrated and measured by PC standard using Agilent 1200 series,
2) Glass transition temperature (° C.): It was measured by DSC Q100 (TA Instruments).

Preparation Example 1: Preparation of Monomer 1

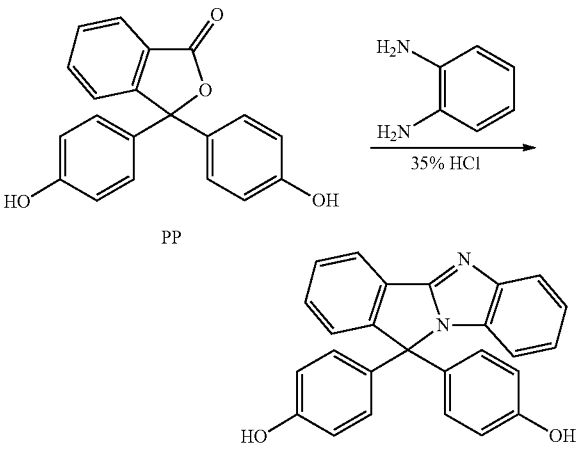

PP

Figure 1:
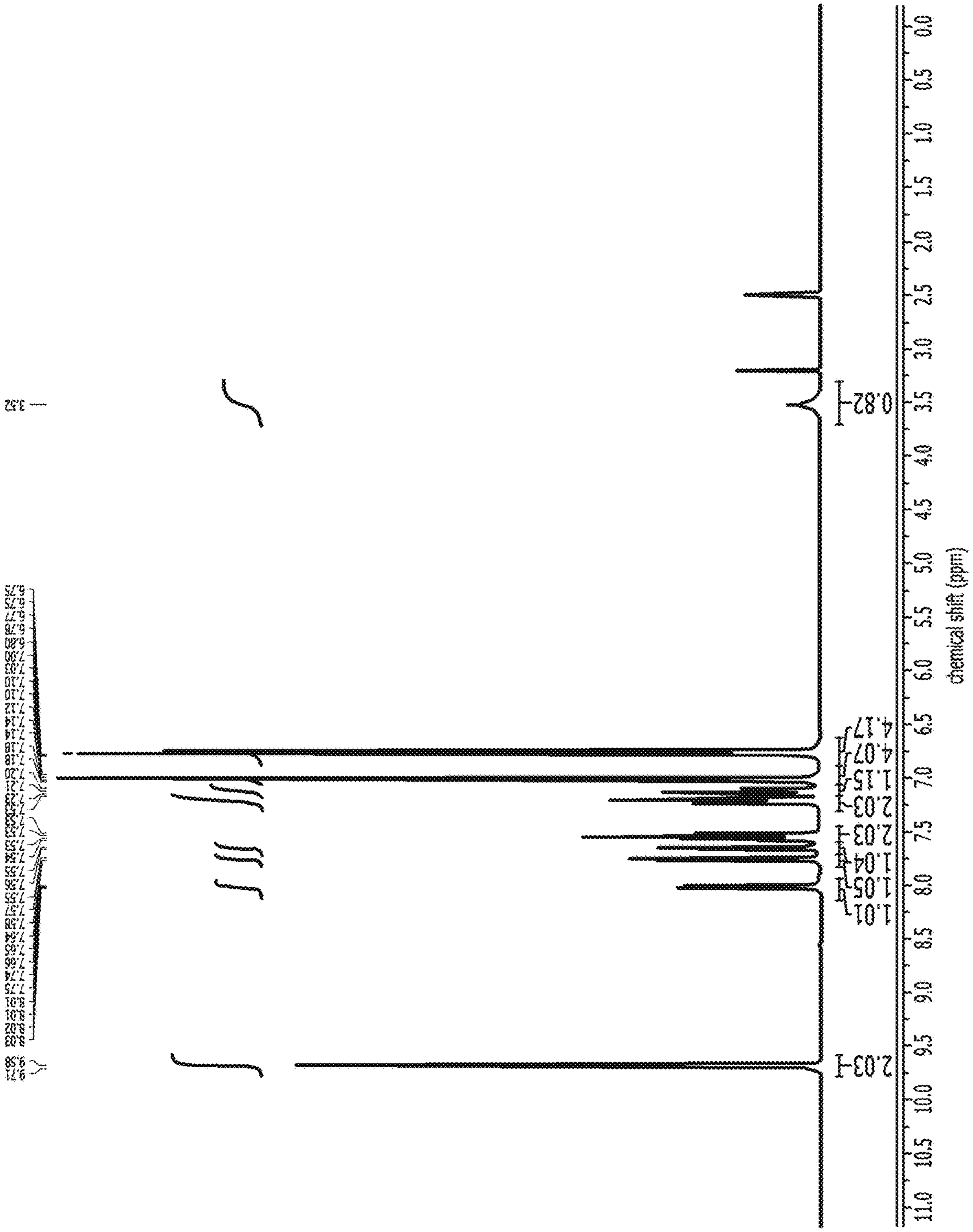
FIG. 1 is shows $^{1}H$ NMR (DMSO-$d_6$) data of the compound prepared in Preparation Example 1 of the present disclosure.

Monomer 1 o-Phenylenediamine (13 g; 120 mmol) and 35% HCl (3.3 mL) were added to a round bottom flask, purged with nitrogen gas for 30 minutes, and then stirred for 1 hour. A PP compound (10 g, 31.4 mmol) was added thereto, and the temperature was slowly raised to 154° C., followed by reaction for 22 hours. After cooling to 120° C., distilled water (30 mL) and 35% HCl (15.4 mL) were added, and stirred for 1 hour. The reaction mixture was cooled to room temperature, filtered, washed with distilled water, and dried. This was dissolved in NaOH solution, absorption-filtered with charcoal and precipitated in HCl. The precipitate was recovered to prepare Monomer 1. The NMR data of the prepared Monomer 1 is shown in FIG. 1, and the MS data is as follows.

MS: $[M+H]^+$=391

Preparation Example 2: Preparation of Monomer 2

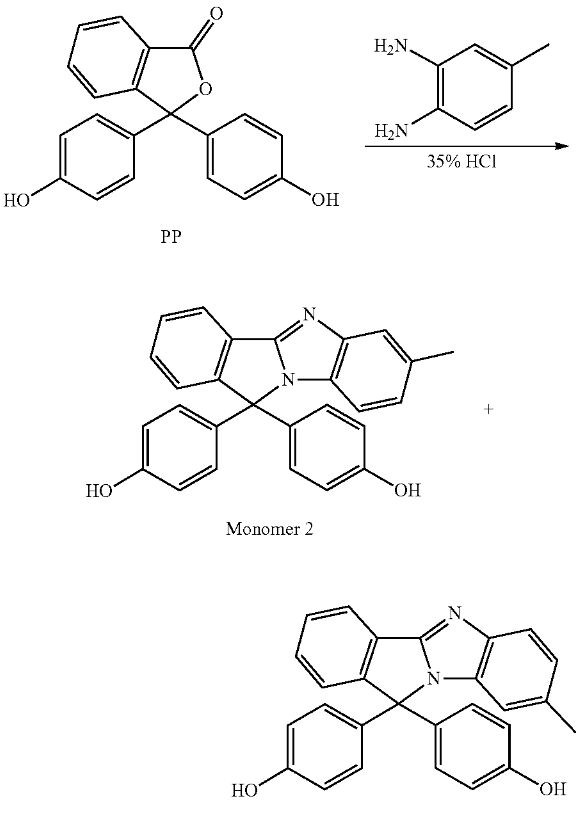

PP

Monomer 2

+

Monomer 2

Figure 2:
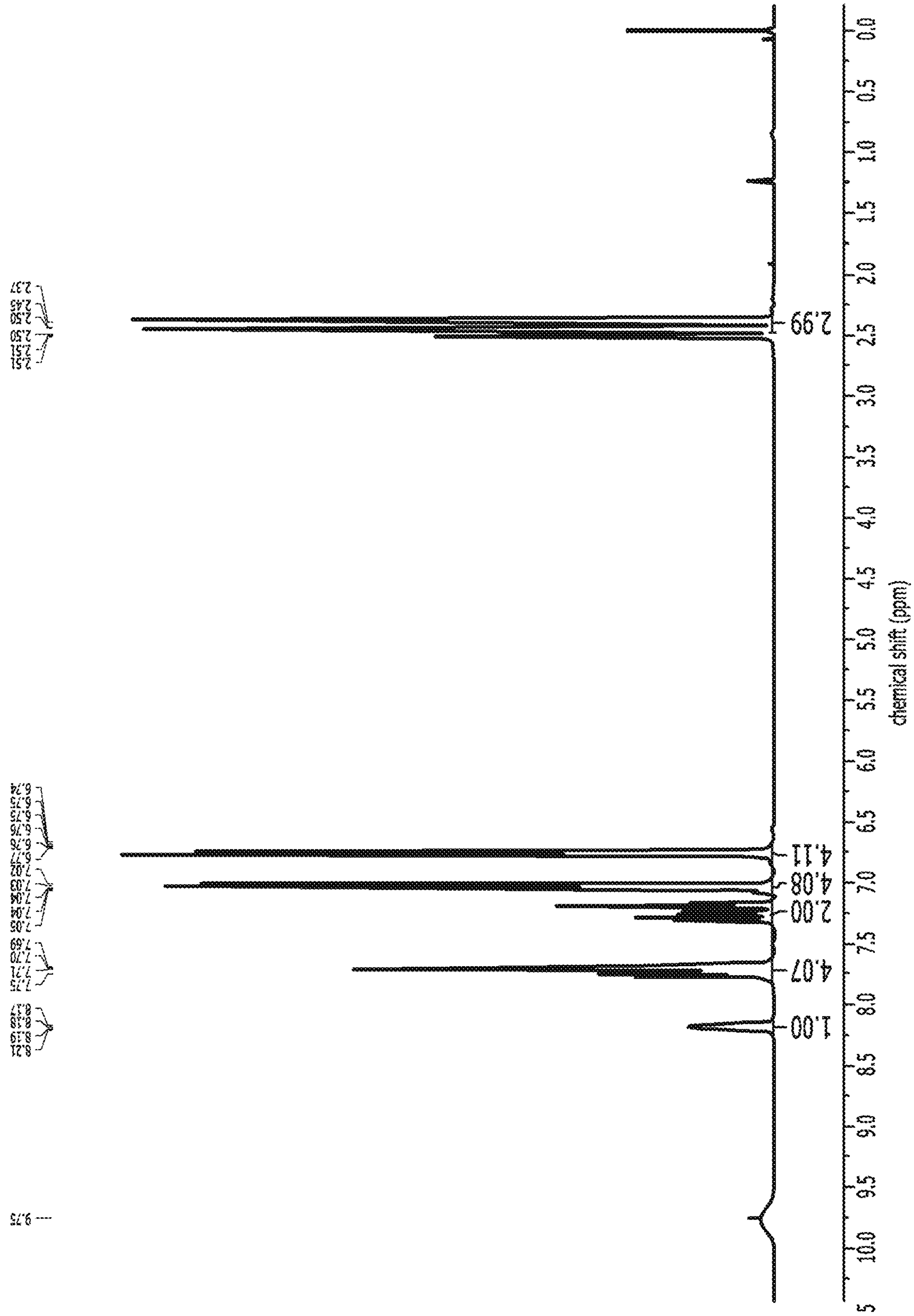
FIG. 2 is shows $^{1}H$ NMR (DMSO-$d_6$) data of the compound prepared in Preparation Example 2 of the present disclosure.

Monomer 2 was prepared in the same manner as in Preparation Example 1, except that 3,4-diaminotoluene (15.4 g, 125.6 mmol) was used instead of o-phenylenediamine. The NMR data of the prepared Monomer 2 is shown in FIG. 2, and the MS data is as follows.

MS: $[M+H]^+$=405

Preparation Example 3: Preparation of Monomer 3

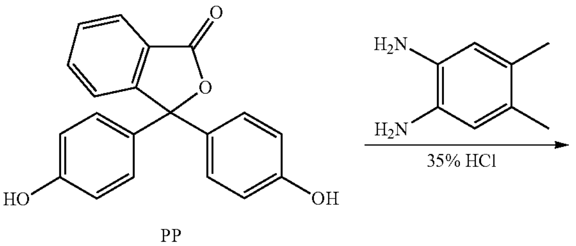

PP

-continued

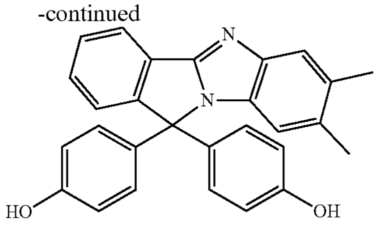

Monomer 3

Figure 3:
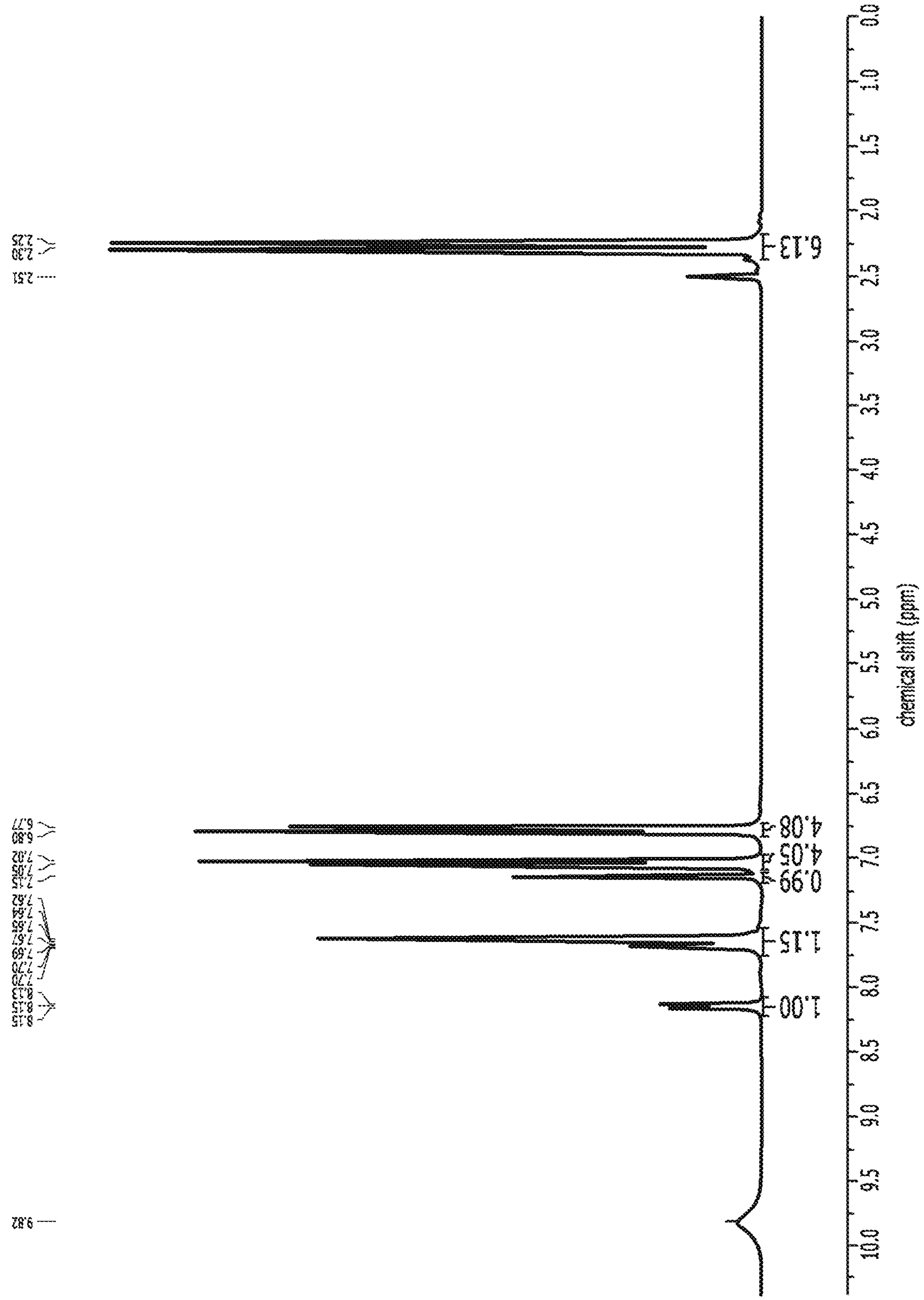
FIG. 3 is shows $^{1}H$ NMR (DMSO-$d_6$) data of the compound prepared in Preparation Example 3 of the present disclosure.

Monomer 3 was prepared in the same manner as in Preparation Example 1, except that 4,5-dimethylbenzene-1,2-diamine (17 g, 125.6 mmol) was used instead of o-phenylenediamine. The NMR data of the prepared Monomer 3 is shown in FIG. 3, and the MS data is as follows.

MS: $[M+H]^+$=419

Preparation Example 4: Preparation of Monomer 4

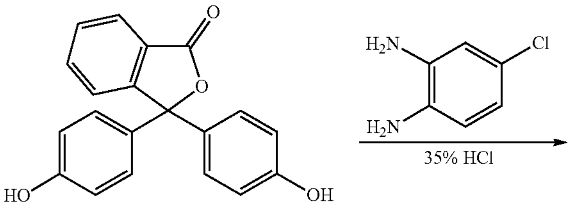

PP

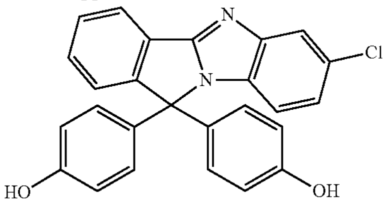

+

Monomer 4

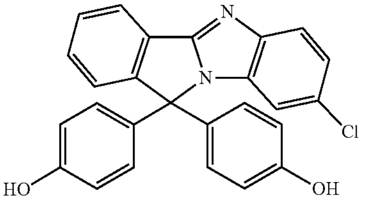

Monomer 4

Monomer 4 was prepared in the same manner as in Preparation Example 1, except that 4-chlorobenzene-1,2-diamine (17 g, 125.6 mmol) was used instead of o-phenylenediamine. The NMR data of the prepared Monomer 4 is as follows.

MS: $[M+H]^+$=425

Example 1: Preparation of Polycarbonate Copolymer

In a 2 L main reactor equipped with a nitrogen purge and a condenser and capable of maintaining a room temperature with a circulator, water (620 g), bisphenol A (BPA; 98.34 g), Monomer 1 (28.05 g), 40 wt % aqueous NaOH solution (102.5 g), and $MeCl_2$ (200 mL) were added, and stirred for about 10 minutes. Nitrogen purging was stopped, and triphosgene (62 g) and $MeCl_2$ (120 g) were added to a 1 L round bottom flask. After dissolving triphosgene, the dissolved triphosgene solution was slowly added to the main reactor. When the addition was completed, PTBP (p-tert-butylphenol; 2.66 g) was added, and stirred for about 10 minutes. Then, 40 wt % NaOH aqueous solution (97 g) was added and then TEA (triethylamine; 1.16 g) was added as a coupling agent. At this time, the reaction pH was maintained at 11 to 13. In order to complete the reaction after 30 minutes, HCl was added and the pH was dropped to 3-4.

Then, the process of stopping the stirring, separating the organic layer and the aqueous layer, then removing the aqueous layer, and adding pure water again for washing was repeated 3 to 5 times. When the washing was completed, only the organic layer was extracted, and polycarbonate copolymer crystals were obtained by a reprecipitation method using a non-solvent using methanol. At this time, the prepared polycarbonate copolymer had a weight average molecular weight of 47,000 g/mol.

Examples 2 to 12: Preparation of Polycarbonate Copolymer

A polycarbonate copolymer was prepared in the same manner as in Example 1, except for adjusting the monomers and the use amount shown in Table 1 below instead of Monomer 1. At this time, the reaction time was adjusted so that the weight average molecular weight of the prepared polycarbonate copolymer was 47,000.

Comparative Example: Preparation of Polycarbonate

A polycarbonate copolymer was prepared in the same manner as in Example 1, except that Monomer 1 was not used. At this time, the reaction time was adjusted so that the weight average molecular weight of the prepared polycarbonate was 47,000.

The glass transition temperatures of the polycarbonate copolymers prepared in Examples and Comparative Examples were measured, and the results are shown in Table 1 below.

TABLE 1

| | Monomer | Content of Monomer relative to the total weight of polycarbonate copolymer | Tg (glass transition temperature: ° C.) |
|---|---|---|---|
| Example 1 | Monomer 1 | 20 wt % | 155 |
| Example 2 | Monomer 1 | 60 wt % | 172 |
| Example 3 | Monomer 1 | 80 wt % | 190 |
| Example 4 | Monomer 2 | 20 wt % | 157 |
| Example 5 | Monomer 2 | 60 wt % | 173 |
| Example 6 | Monomer 2 | 80 wt % | 192 |
| Example 7 | Monomer 3 | 20 wt % | 160 |
| Example 8 | Monomer 3 | 60 wt % | 179 |
| Example 9 | Monomer 3 | 80 wt % | 203 |
| Example 10 | Monomer 4 | 20 wt % | 152 |
| Example 11 | Monomer 4 | 60 wt % | 168 |
| Example 12 | Monomer 4 | 80 wt % | 181 |
| Comparative Example | (Not used) | — | 147 |

As shown in Table 1, it can be confirmed that the polycarbonate copolymer including the repeating unit of Chemical Formula 1 according to Examples of the present disclosure has an increased in glass transition temperature as compared to the polycarbonate of Comparative Examples.

Therefore, it can be confirmed that as the structure of Chemical Formula 1 according to the present disclosure is included in the structure of the polycarbonate, the heat resistance is improved.

The invention claimed is:

1. A polycarbonate copolymer, comprising a repeating unit of Chemical Formula 1:

[Chemical Formula 1]

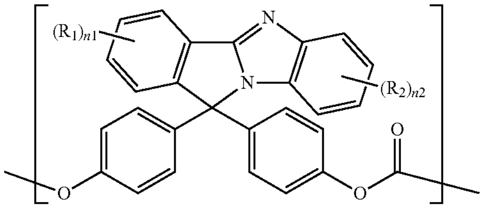

wherein in Chemical Formula 1:

$R_1$ and $R_2$ are each independently hydrogen, a $C_{1-10}$ alkyl, a $C_{1-10}$ alkoxy, or halogen; and n1 and n2 are each independently an integer of 0 to 4.

2. The polycarbonate copolymer according to claim 1, wherein $R_1$ is hydrogen.

3. The polycarbonate copolymer according to claim 1, wherein each $R_2$ is independently hydrogen, a $C_{1-4}$ alkyl, a $C_{1-4}$ alkoxy, or halogen.

4. The polycarbonate copolymer according to claim 1, wherein each $R_2$ is independently hydrogen, methyl, or chloro.

5. The polycarbonate copolymer according to claim 1, wherein the repeating unit of Chemical Formula 1 is any one selected from the group consisting of:

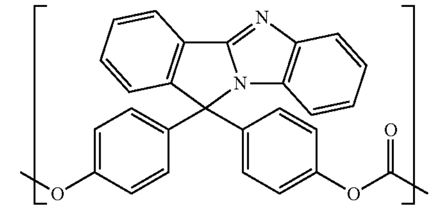

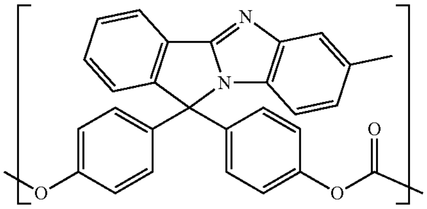

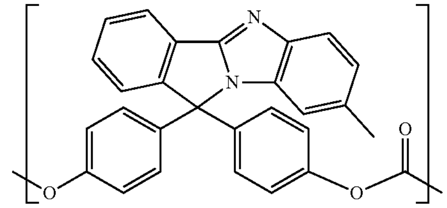

-continued

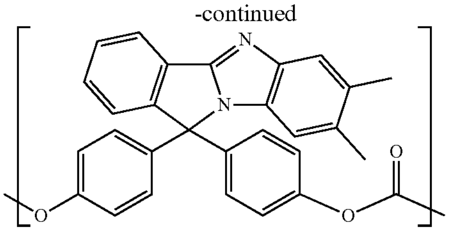

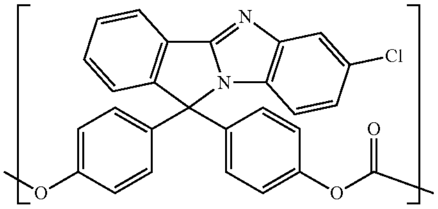

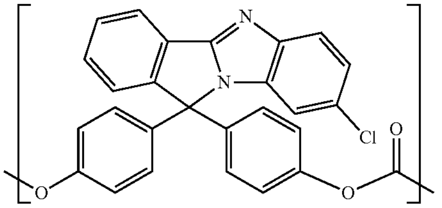

.

6. The polycarbonate copolymer according to claim 1, wherein the polycarbonate copolymer further comprises a repeating unit of Chemical Formula 2:

[Chemical Formula 2]

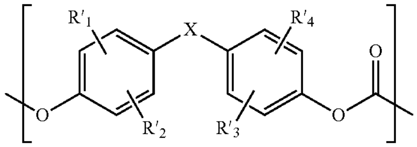

wherein in Chemical Formula 2:

X is a $C_{1-10}$ alkylene that is unsubstituted or substituted with phenyl, a $C_{3-15}$ cycloalkylene that is unsubstituted or substituted with a $C_{1-10}$ alkyl, O, S, SO, $SO_2$, or CO; and $R'_1$ to $R'_4$ are each independently hydrogen, a $C_{1-10}$ alkyl, a $C_{1-10}$ alkoxy, or halogen.

7. The polycarbonate copolymer according to claim 6, wherein Chemical Formula 2 is the following:

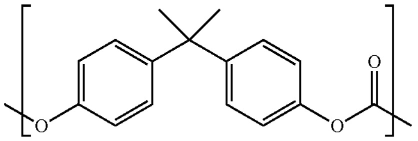

.

8. The polycarbonate copolymer according to claim 6, wherein a weight ratio between the repeating unit of Chemical Formula 1 and the repeating unit of Chemical Formula 2 is 10:90 to 90:10.

9. The polycarbonate copolymer according to claim 1, wherein a weight average molecular weight of the polycarbonate copolymer is 10,000 to 100,000.

10. The polycarbonate copolymer according to claim 1, wherein a glass transition temperature of the polycarbonate copolymer is 150 to 220° C.

11. An article comprising the polycarbonate copolymer according to claim 1.

* * * * *